Nov. 19, 1929.  J. P. SPANG  1,736,137

MEAT TENDERING DEVICE

Filed Aug. 11, 1928

Inventor.
Joseph P. Spang
by Heard Smith & Tennant
Attys.

Patented Nov. 19, 1929

1,736,137

UNITED STATES PATENT OFFICE

JOSEPH P. SPANG, OF QUINCY, MASSACHUSETTS

MEAT-TENDERING DEVICE

Application filed August 11, 1928. Serial No. 298,980.

This invention relates to a machine for tendering meat and has particular reference to a machine of the type shown in my Patent No. 1,649,992, dated November 22nd, 1927. The device illustrated in said patent comprises a bed frame carrying a rotatable turntable on which the meat to be tendered is supported and a pivoted knife carrier in which is mounted a reciprocating head carrying rotary knives which operate to slit the meat as the head is reciprocated. The device illustrated in said patent is further provided with a combined clamping and stripping member which serves to yieldingly hold the meat on the plate during the slitting operation and which also serves to strip the meat from the knives when the knife carrier is raised.

The turntable illustrated in said patent is provided with a handle by which it may be manually turned at the end of the forward stroke of the head so that on the return stroke the knives will cut slits in the meat which are at an angle to those formed on the forward stroke. In order to enable the turntable to be turned, however, it is necessary to raise the knife carrier so as to remove the combined clamping and stripping member from contact with the meat.

It is one of the objects of my present invention to provide novel means whereby the combined clamping and stripping member is automatically raised from its clamping position at the end of the forward stroke so that the turntable with the meat thereon may be turned without the necessity of raising the knife carrier. One operation is thereby saved and thus the slitting of the meat is facilitated.

In order to give an understanding of the invention I have illustrated in the drawings a selected embodiment thereof which will now be described, after which the novel features will be pointed out in the appended claims.

Figure 1:
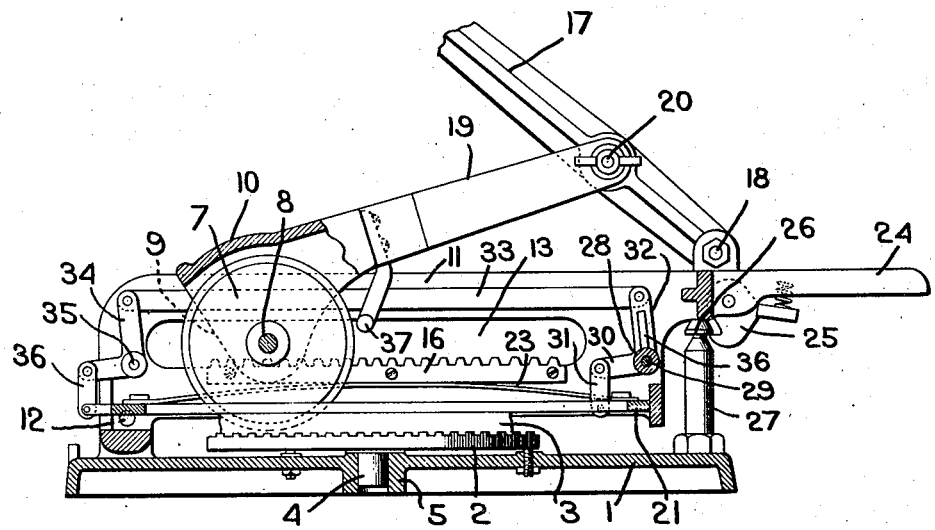
Figure 1 is a vertical sectional view on substantially the line 1—1, Fig. 2, illustrating a meat-tendering machine embodying my invention.
Figure 2:
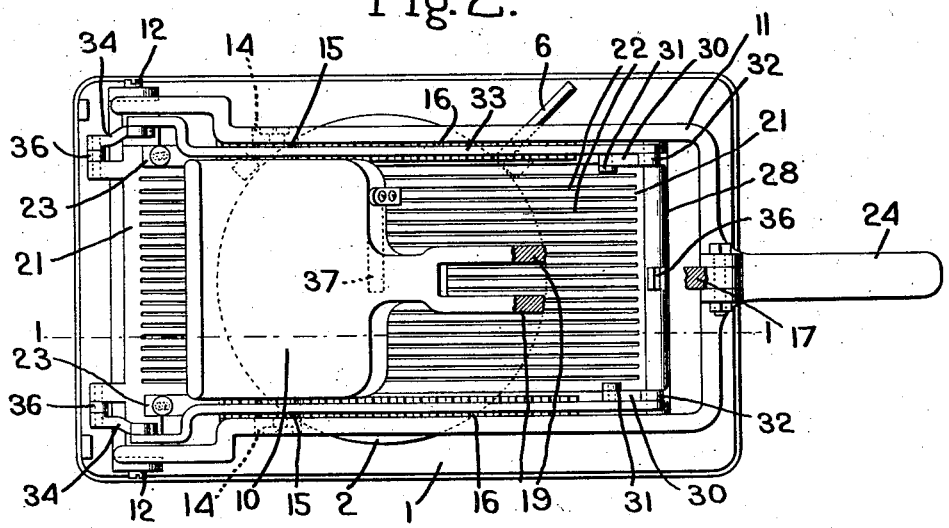
Fig. 2 is a top plan view of Fig. 1.

The machine shown in the drawings is in many respects similar to that shown in my Patent No. 1,649,992 and it comprises a base frame 1 on which is mounted a turntable 2 adapted to carry the meat 3 to be tendered. The turntable is shown as having a stud 4 depending therefrom which is journalled in a bearing 5 formed in the base frame 1 and it is provided with a handle 6 by which it may be manually turned, as will be presently described.

The slitting knives by which the meat is tendered are shown at 7. These are illustrated as disk knives fast on a shaft 8 which is journalled in the cheek pieces 9 of a head 10, the latter being adapted for reciprocating movement in a knife carrier 11 which is pivoted to the base frame at 12. Said knife carrier is formed with the two side members, each having a slot 13 therein and the shaft 8 has on its ends rolls 14 which operate in said slots. Said shaft also has fast thereon pinions 15 which mesh with the teeth of racks 16 that are carried by the sides of the knife carrier 11 so that when the head 10 moves back and forth the engagement of the gear teeth 15 with the teeth of the rack 16 will rotate the knives rapidly thus causing them to have a shearing cut.

The head 10 is given its reciprocating movement through the medium of an operating lever 17 pivoted to the knife carrier at 18, said head having a forward extension 19 which is pivotally connected to the lever at 20. The knife carrier supports a combined clamping and stripping member 21 which is provided with slits 22 and which the knives operate. This clamping and stripping member carries two leaf springs 23 which engage the under side of the racks 16 and which thus yieldingly hold the combined clamping and stripping member against the meat 3.

The knife carrier 11 is provided with a handle 24 by which it may be swung about its pivot 12 and it is normally latched in its operative position by means of a spring-pressed latch 25 adapted to engage a shoulder 26 formed on the post 27 which rises from the frame.

The construction thus far described is substantially the same as that illustrated in my above-mentioned Patent No. 1,649,992. In operating the device of said patent the operator will raise the knife carrier 11 and place a piece of meat 3 on the turntable 2 and will then lower the knife carrier into its operative position thereby causing the combined clamping and stripping member to clamp the meat against the turntable and then he will swing the lever 17 forwardly thus causing the knives to make one pass across the meat and to cut a plurality of slits therein.

With the device shown in said patent it is necessary to raise the knife carrier at the end of the forward stroke so as to relieve the clamping pressure on the meat of the combined clamping and stripping member 21 before the turn-table can be turned by the handle 6. In my present invention, however, I have provided means whereby this clamping pressure is automatically relieved so that the turntable may be turned without raising the knife carrier and this is accomplished by devices which are actuated by the head 10 as it approaches the end of its forward stroke.

28 indicates a sleeve which is journalled on a rod 29 that is carried by the knife carrier 11. This sleeve has an arm 30 rigid therewith at each end and each arm is pivotally connected by a link 31 to the forward end of a combined clamping and stripping member 21. This sleeve 28 is also provided at each end with an upstanding arm 32 and each arm 32 is connected by a link 33 with the vertical arm of an elbow lever 34 which is pivoted at 35 to one of the sides of the knife carrier 11. The horizontal arm of each elbow lever 34 is connected by a link 36 with the rear end of the combined clamping and stripping member 21.

Means are provided whereby during the final forward movement of the head 10 the sleeve 28 will be given a clockwise movement Fig. 1 thereby raising the arms 30 and thus the forward end of the combined clamping and stripping member 21, and also operating through the link connection 33 and elbow lever 34 to raise the rear end of said combined clamping and stripping member.

The sleeve 28 is provided with an upstanding projection 36 which is adapted to be engaged by a bunter 37 carried by the head 10 just before the head reaches the limit of its forward stroke. Hence when the head is moved forwardly and just before the head reaches the limit of its forward movement the bunter 37 will engage the arm 36 and thereby turn the sleeve 38 with the result that the combined clamping and stripping member 21 will be raised sufficiently to release its clamping engagement with the meat.

While it is in its raised position the turntable with the meat thereon will be free to be turned by the handle 6 and as soon as the operating handle 7 begins its rearward movement the pressure of the bunter 37 against the arm 36 will be released so that the combined clamping and stripping member 21 will be restored to its operative position through the medium of the springs 23. With this device, therefore, the meat is unclamped automatically and by the operation of the main actuating lever 17 at the end of the forward stroke thus permitting the turntable to be turned before the return stroke and without the necessity of raising the knife carrier. This thus facilitates and speeds up the operation of the machine.

I claim:

1. In a meat-tendering device, the combination with a bed frame, of a meat-supporting turntable thereon, a knife carrier, a head mounted to reciprocate in the knife carrier, a plurality of knives carried by said head, a combined clamping and stripping member yieldingly clamping the meat against the turntable, and means actuated by the head as it approaches the end of its movement to raise the combined clamping and stripping member thereby to relieve the clamping pressure on the meat so that the turntable may be manually turned.

2. In a meat-tendering device, the combination with a bed frame, of a manually operable meat-supporting turntable mounted thereon, a knife carrier, a head mounted for reciprocation in the knife carrier, a plurality of knives carried by the head, a combined clamping and stripping member yieldingly mounted on the knife carrier, and head-actuated means to raise the combined clamping and stripping member to permit the turntable to be turned.

3. In a meat-tendering device, the combination with a bed frame, of a meat-supporting turntable mounted thereon, a knife carrier pivoted to the bed frame, a head reciprocating in said knife carrier, a plurality of knives carried by the head, means to give the head its reciprocating movement, a combined clamping and stripping member carried by the knife carrier, and means also carried by the knife carrier for raising said combined clamping and stripping member thereby to relieve the clamping pressure on the meat so that the turntable can be turned.

4. In a meat-tendenring device, the combination with a bed frame, of a meat-supporting turntable mounted thereon, a knife carrier pivoted to the bed frame, a head reciprocating in said knife carrier, a plurality of knives carried by the head, means to give the head its reciprocating movement, a combined clamping and stripping member carried by the knife carrier, and means also carried by the knife carrier for raising said combined clamping and stripping member, and means to actuate the last-named means by the movement of the head as it approaches the end of its stroke.

In testimony whereof, I have signed my name to this specification.

JOSEPH P. SPANG.